US012323079B2

(12) United States Patent
Maldonado et al.

(10) Patent No.: US 12,323,079 B2
(45) Date of Patent: Jun. 3, 2025

(54) SYSTEM AND METHOD FOR CONTROLLING HYBRID AND GRID POWER IN AN ELECTRIC FRACTURING SPREAD

(71) Applicant: Halliburton Energy Services, Inc., Houston, TX (US)

(72) Inventors: Jose L Maldonado, Houston, TX (US); Glenn Howard Weightman, Duncan, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 40 days.

(21) Appl. No.: 18/386,013

(22) Filed: Nov. 1, 2023

(65) Prior Publication Data
US 2025/0141385 A1 May 1, 2025

(51) Int. Cl.
H02P 27/04 (2016.01)
E21B 43/26 (2006.01)

(52) U.S. Cl.
CPC ........ H02P 27/047 (2013.01); E21B 43/2607 (2020.05)

(58) Field of Classification Search
CPC ........ H02P 27/04; H02P 27/047; E21B 43/26; E21B 43/2607
See application file for complete search history.

(56) References Cited

PUBLICATIONS

Electronic Acknowledgment Receipt, U.S. Appl. No. 17/857,321 entitled "Load Management for Power Systems," filed Jul. 25, 2022, 31 pages.
Electronic Acknowledgment Receipt, U.S. Appl. No. 17/857,263 "Management of Power Rate Change," filed Jul. 5, 2022, 29 pages.

Primary Examiner — Robert L Deberadinis
(74) Attorney, Agent, or Firm — Conley Rose, P.C.; Rodney B. Carroll

(57) ABSTRACT

A load phase back system for controlling a plurality of electrical loads in an electric fracturing spread. The load phase back system comprises monitoring circuitry configured to monitor input power received from an electric power source. The monitoring circuitry determines a measured voltage and a measured frequency of the input power. A controller controls the power applied to the plurality of electrical loads from a power bus according to a value of the measured voltage and a value of the measured frequency of the input power. The controller reduces power applied to selected ones of the plurality of electrical loads from the power bus when at least one of the measured voltage is less than a first threshold and the measured frequency is less than a second threshold.

22 Claims, 9 Drawing Sheets

SYSTEM AND METHOD FOR CONTROLLING HYBRID AND GRID POWER IN AN ELECTRIC FRACTURING SPREAD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores may be drilled into subterranean formations to extract desired natural including reservoir fluids such as crude oil, natural gas, and/or other hydrocarbons. Desired reservoir fluids in some cases may be hot water for geothermal surface applications. In some cases, the drilled wellbores may be stimulated in one or more ways. Hydraulic fracturing is a type of stimulation treatment that has long been used in unconventional reservoirs. A stimulation treatment operation may involve drilling a horizontal wellbore and injecting treatment fluid into a surrounding formation in multiple stages via a series of perforations or entry points along a path of a wellbore through the formation. During each stimulation treatment, different types of fracturing fluids, proppant materials (e.g., sand), additives, and/or other materials may be pumped into the formation via the entry points or perforations at high pressures and/or rates to initiate and propagate fractures within the formation to a desired extent. Other well servicing equipment is needed to assist with the well stimulation equipment in order to successfully produce reservoir fluids from these unconventional reservoirs in a subsurface formation.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
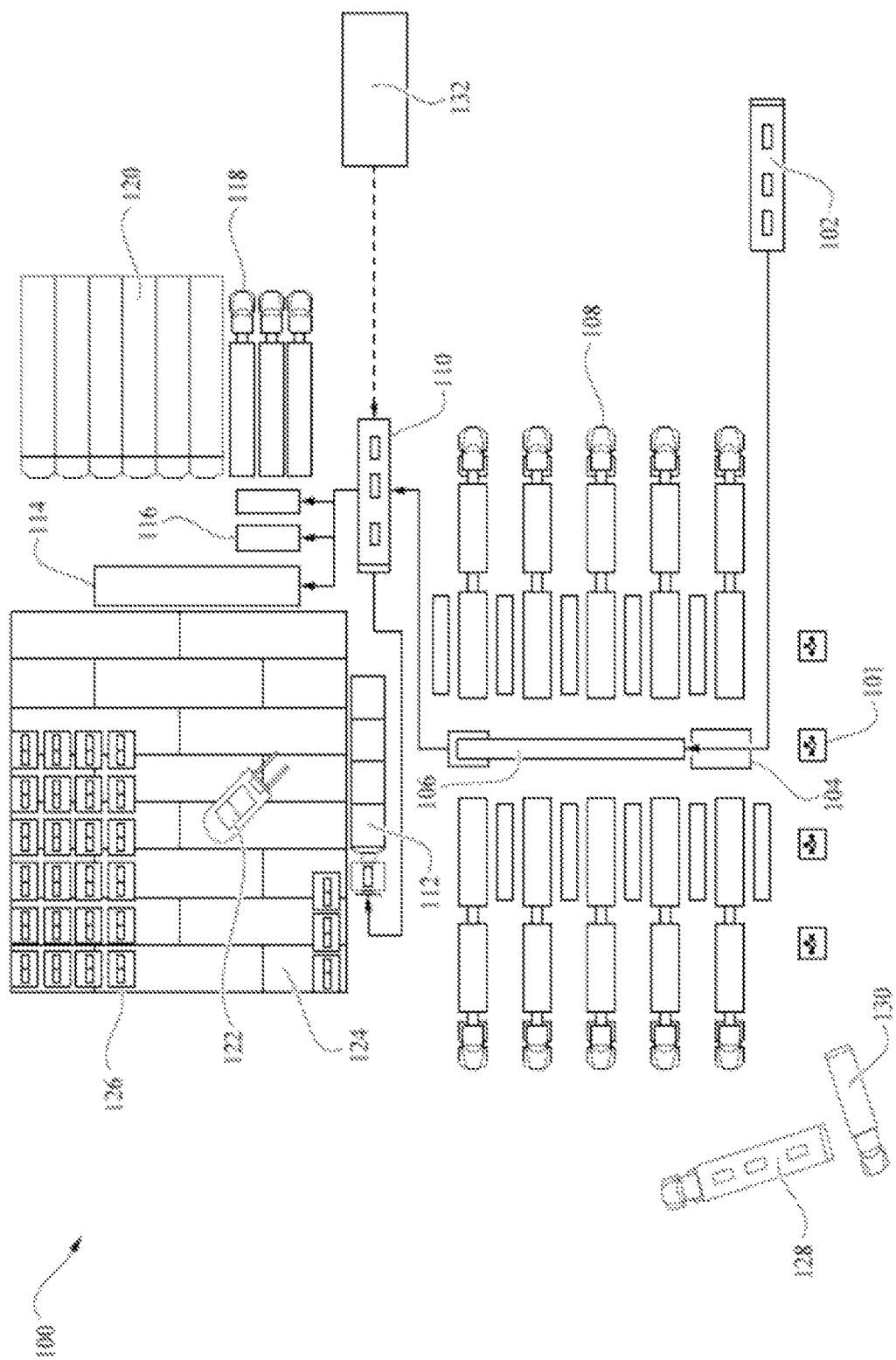
FIG. 1 is an illustration of a hydraulic fracturing well stimulation job equipment spread according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

To enable fracturing fluids to fracture the formation, a large amount of electric power may be used to drive pumping units that can create pressures needed to fracture the subsurface formation with the fracturing fluids. One or more of these pumping units may be driven by, for example a variable frequency drive (VFD). A variable frequency drive is a type of motor controller that drives an electric motor by varying the frequency and voltage of the power supply to the electric motor. Variable frequency drives may be used to adjust flow or pressure to the actual demand. A VFD may control the frequency of the electrical power supplied to a pump or a fan and thereby control the rotational speed of the electric motor.

A VFD also has the capacity to control ramp-up and ramp-down of the motor during start operations or stop operations, respectively. These pumping units can be located at a surface above the formation typically proximate to a wellbore(s) at a well site.

The electric power can come from various sources. The various sources of electric power can fall into two general categories: locally generated power and grid (or utility) power. In both cases, electric power is limited both in magnitude and a rate-of-change of supply of power. Examples of locally generated electric power can be generators (or gensets) that are typically powered by natural gas turbines or diesel engines (however they can be generated by other means) or other types of locally generated power. Both locally generated electric power and utility generated electric power (typically conveyed to the well site by conventional transmission means, e.g., high voltage power lines) are limited based on the electric power source(s) and are subject to being depleted by the pumping units or other loads, including but not limited to blending equipment, wireline equipment, wireline pump-down pumps, control vans, water transfer equipment, sand handling equipment, etc.

The present disclosure discloses a blender power unit (BPU) for use in well stimulation jobs, such as fracturing jobs and/or acidation jobs. The disclosed BPU receives power from one or more electric power cables and distributes power to a plurality of electric loads related to an electric fracturing spread or a wellbore servicing operation. An electrical load is any component in the electric fracturing spread or the wellbore servicing operation that consumes electric power or energy. Example electric loads may include, but are not limited to, electric motors that provide torque to blending pumps, fracturing fluid pumps, pumps associated with an express blending trailer (EBT), a fluid management trailer (FMT), transport trucks, clean boost pumps (CBPs), and/or centrifugal pumps. The BPU can be powered by one electric power input cables and can supply electric power to, for example, four or more blender pump motors, reducing the number of cables needed to be run from the power distribution unit (PDU).

In an embodiment, the BPU may receive electric power from any electric power source, such as from an electric grid power and/or from locally generated power such as an in-field electric generator driven by a combustion driven prime mover. In this case, the motors driving the fracturing pumps may be conventional diesel motors, for example, in cases where an energy company is averse to adopting the use of electric power for operating the fracturing pumps. The BPU disclosed herein provides both the advantage of reducing cables connecting to a PDU when a PDU is the source of power to operate a fracturing spread and the advantage of allowing independent electric power sourcing for blender pumps when conventional diesel power is used to drive the fracturing pumps.

In an embodiment, the BPU comprises a transformer that receives electric power at a first voltage level and outputs electric power at a second voltage level (typically a stepped-down voltage level) to a motor power bus. The motor power bus is connected to one or more motor soft starters, and the one or more motor soft starters are connected to a motor starter bus. Each of a plurality of motor switch gear units are configured to be coupled to the motor starter bus through a motor start relay and to be coupled to the motor power bus through a motor run relay. The motor switch gear units are coupled to one or more electric motors that provide prime mover rotating power to blender pumps or to hydraulic power packs which in turn supply rotating power to blender pumps. For example, when a motor coupled to a motor switch gear unit is desired to be running, the motor start relay associated with that motor switch gear unit is closed, supplying electric power from the one or more motor soft starters to gently power on the motor and bring it up to operating speed. When the motor reaches nominal operating speed, the motor start relay associated with that motor switch gear unit is opened, and the motor run relay associated with that motor switch gear unit is closed, supplying continuous electric power from the motor power bus to run the motor via that motor switch gear.

The motor start relays and the motor run relays may be controlled by a control module such as a computer, a control system, or a programmable logic controller (PLC). The motor start relays may be operated such that only one motor switch gear unit is coupled to the motor starter bus at one time. The use of a motor starter bus that can be used to start different motors at different times allows reducing the capital costs of providing motor soft starters for each separate motor.

The operation of an electric fracturing system may be interrupted when the power supply input voltage and frequency are suddenly reduced due to disturbances, while the load requirements remain unchanged. The system may recover without external assistance if the conditions that caused the disturbance cease rapidly or have a reduced magnitude. However, an operation shutdown may occur if the disturbance goes unattended beyond the system stability limits.

The present disclosure describes a load phase back system configured to reduce the load when the power supply input voltage and frequency are diminished for any reason. The disclosed system may sense the reduction of the power input voltage and frequency and may immediately reduce the VFD output to prevent a potential jobsite blackout (e.g., a loss of power to all or a portion of electrically powered equipment at a wellsite). The disclosed load phase back system may release the load restrictions when the voltage and frequency parameters are recovered within acceptable limits. In an embodiment, reducing the load may comprise reducing the load from a full nominal load to between 95 percent of nominal load to 60 percent of nominal load, from a full nominal load to between 90 percent of nominal load to 65 percent of nominal load, from a full nominal load to between 85 percent of nominal load to 70 percent of nominal load, from a full nominal load to between 80 percent of nominal load to 70 percent of nominal load. Additionally, the load phase back may be progressively ramped over time from the full nominal load to the reduced load.

The load phase back system disclosed herein reduces the likelihood of blackouts when the power supply input voltage and frequency are reduced during fracturing operations, thereby reducing operations downtime. The load phase back algorithm described herein reduces the magnitude of transient conditions, which may also help the wellsite power supply system to recover more quickly when the conditions that originated the event are removed.

In an example implementation, a computer, microprocessor or PLC based load phase back system monitors the system voltage and frequency and continuously compares the magnitude of the readings with the programmable phase back pickup values for both parameters. The phase back system may operate on undervoltage and/or under-frequency events. The load phase back system may operate with one or more medium voltage power supply inputs connected in parallel to the fracking distribution system or electrically isolated from each other. It may also operate when electrical systems (e.g., wellsite fracturing equipment such as pumps and blenders driven by electric motors or other equipment consuming electricity) operate in parallel with mechanical/diesel systems (e.g., wellsite fracturing equipment such as pump and blenders driven by combustion fired prime movers such as diesel engines).

In an implementation, the disclosed phase back system may be centralized, such that a single computer, processor or PLC distributes the phase back signal to all the medium voltage consumers. It also can be installed in each medium voltage consumer, such that any load can be reduced individually and have its own phase back pickup setpoint, low load limit, and phase back and recovery ramp rates.

The disclosed load phase back system may remain inoperative when the system voltage is reduced but recovers before the condition reaches the pickup setpoint, the duration of a programmable time delay. The system may start phasing back the load at a programmable ramp rate when the setpoint is reached and the time delay has expired. The load phase back reduction may continue until a programmable low load limit is reached. The system may start easing the load restrictions at a programmable recovery ramp rate when the system voltage has recovered to acceptable values.

The disclosed load phase back system also may shift load to a diesel system during hybrid operation—or to other independent electrical supplies—to reduce the magnitude of undervoltage conditions. The load may be transferred back to the faulty power supply to reduce the magnitude of overvoltage conditions during recovery.

The disclosed load phase back system may remain inoperative when the system frequency is reduced but recovers before the condition reaches the pickup setpoint, the duration of a programmable time delay. The system may start phasing back the load at a programmable ramp rate when the setpoint is reached and the time delay has expired. The load phase back reduction may continue until a programmable low load limit is reached. The system may start casing the load restrictions at a programmable recovery ramp rate when the system frequency has recovered to acceptable values.

The disclosed load phase back system also may shift load to a diesel system during hybrid operation—or to other independent electrical supplies—to reduce the magnitude of underfrequency conditions. The load may be transferred back to the faulty power supply to reduce the magnitude of over frequency conditions during recovery.

In an alternate embodiments, the disclosed load phase back system may operate on a voltage/frequency ratio. Under these conditions, the system may start phasing back the load when a programmable voltage/frequency ratio setpoint is reached and a programmable time delay has expired. The load phase back system remains inoperative when the voltage and frequency are reduced but recover before the voltage/frequency ratio reaches the setpoint, the duration of a programmable time delay. The disclosed system may start phasing back the load at a programmable rate when the V/F setpoint ratio is reached and the time delay has expired. The load phase back reduction may continue until a programmable low load limit is reached. The system may start easing the load restrictions at a programmable load recovery ramp rate when the voltage/frequency ratio has recovered to acceptable values.

The load phase back system also may shift load to a diesel system during hybrid operation—or to other independent electrical supplies—to reduce the magnitude of undervoltage and underfrequency conditions. The load may be transferred back to the faulty power supply to reduce the magnitude of over-voltage and over-frequency conditions during the recovery.

Turning now to FIG. 1, a fracturing spread 100 is described. In an embodiment, the fracturing spread 100 comprises one or more wellbores 101, a power distribution unit (PDU) 102, a cable transport unit 104, a manifold 106, a plurality of fracturing pump trucks 108, and a blender power unit (BPU) 110. The fracturing spread 100 may comprise an express blending trailer (EBT) 112, a fluid management trailer (FMT) 114, one or more clear boost pumps (CBPs) 116, and one or more transport trucks 118. The PDU 102 may be trailer mounted or skid mounted. The cable transport unit 104 may be trailer mounted or skid mounted. The fracturing spread 100 may comprise a plurality of fracturing water tanks 120. The fracturing spread 100 may comprise a fork lift 122 that moves sand containers 126 for mounting onto the EBT 112 for blending sand with clear fluids to make fracturing fluid. In an embodiment, the fork lift 122 may drive about on a plurality of wooden pads 124 commonly referred to as "the dance floor." In an embodiment, the fracturing spread 100 comprises a technical command center (TCC) 128 and a logging truck 130. The TCC 128 may be trailer mounted or skid mounted.

Figure 2:
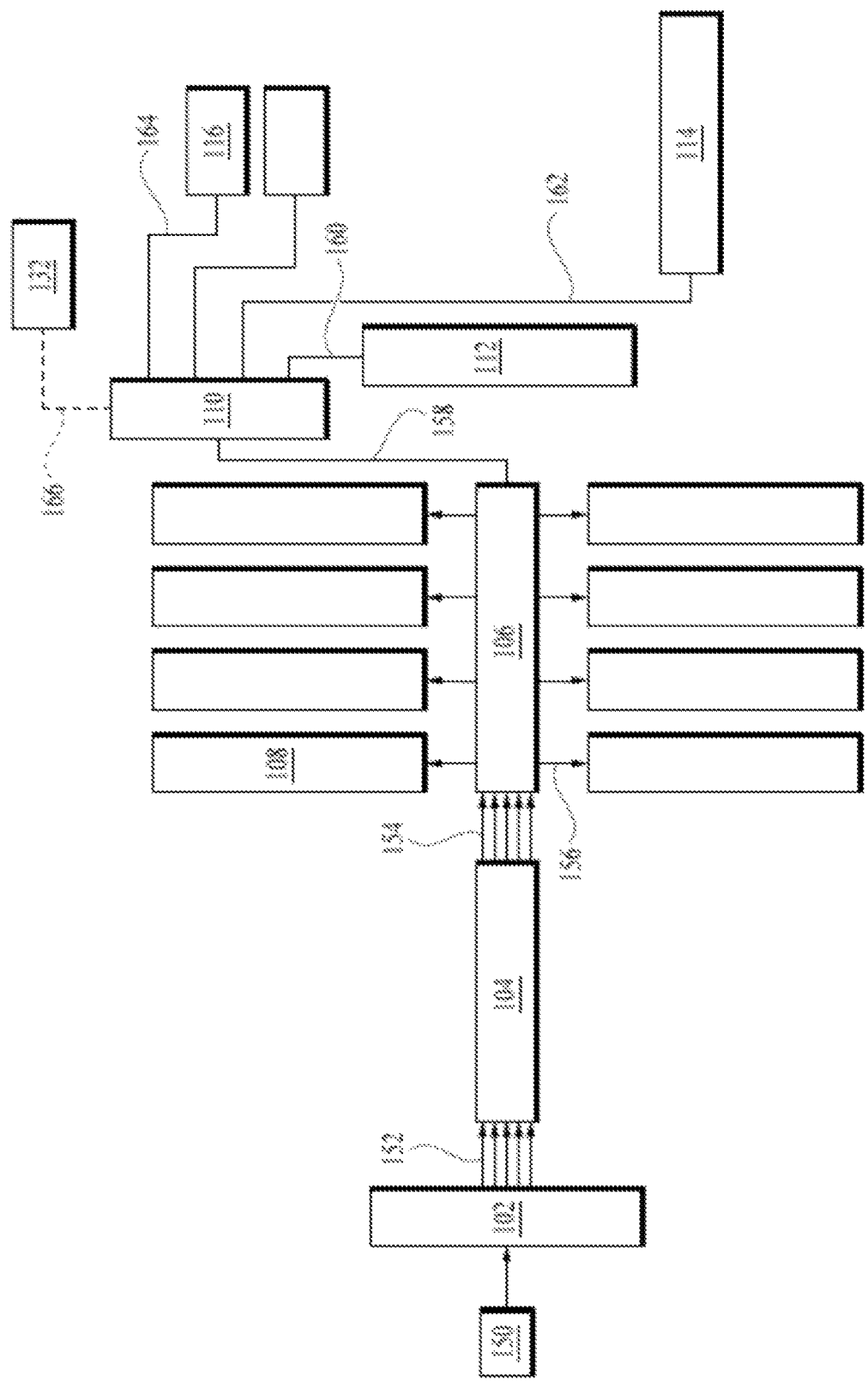
FIG. 2 is an illustration of electrical power distribution of a hydraulic fracturing well stimulation job equipment spread according to an embodiment of the disclosure.

FIG. 1 is largely provided to enumerate the main items of equipment included in the fracturing spread 100 and not to illustrate fluid flow lines. The PDU 102 is illustrated as providing electric power (e.g., via the arrows in FIG. 1) to the manifold 106, and the manifold 106 routes this PDU 102 supplied electric power to the BPU 110. The flow of electric power from the PDU 102 to the fracturing pump trucks 108 is illustrated in FIG. 2 and described with reference to FIG. 2 below. The BPU 110 provides electric power to the EBT 112, to the FMT 114, and to the CBPs 116.

The manifold 106 operates as a fluid manifold as well as an electric power distribution hub. Low pressure fracturing fluid may be pumped by the EBT 112 to a low-pressure side of the manifold 106, and the manifold 106 may distribute this low-pressure fracturing fluid to fracturing pumps mounted on the fracturing pump trucks 108. In some implementation, a fracturing pump truck 108 may include one or more variable frequency drives (VFD), one or more electric motors receiving electric power from the VFDs, and one or more fracturing pumps that receive torque or rotating power from the electric motors.

The low-pressure fracturing fluid may exhibit a pressure from 0 PSI to 250 PSI, for example about 175 PSI to about 225 PSI. The fracturing pumps on the fracturing pump trucks 108 pump high pressure fracturing fluid to a high-pressure side of the manifold 106, and the manifold 106 routes this high-pressure fracturing fluid into the one of the wellbores 101 undergoing the fracturing job. In an embodiment, the manifold 106 may route high pressure fracturing fluid to more than one of the wellbores 101 concurrently in some situations. The high-pressure fracturing fluid (e.g., fracturing fluid output by the fracturing pumps mounted on the fracturing pump trucks 108) may exhibit a pressure from 0 PSI to 30,000 PSI, for example about 7,000 PSI to 15,000 PSI, or about 7,000 PSI to 25,000 PSI, or about 18,000 PSI to about 22,000 PSI, or about 19,000 PSI to about 21,000 PSI.

The TCC 128 may provide facilities for fracturing operators to control the fracturing job via one or more workstations. The TCC 128 may receive sensor outputs from various equipment in the fracturing spread 100, including the logging truck 130, and present readouts of some of these sensor outputs on one or more workstations. Workstations and/or control systems in the TCC 128 may be used to set control parameters of the PDU 102, the fracturing pump trucks 108, the BPU 110, the EBT 112, the FMT 114, and the CBPs 116. Workstations and/or control systems in the TCC 128 may be used to control fluid flow valves at various locations in the fracturing spread 100. The TCC 128 may provide wireless and/or wired communications to different fracturing personnel located around the fracturing spread 100 as well as wireless and/or wired communications to a regional and/or central office of the energy company and/or fracturing service company.

In an embodiment, the fracturing spread 100 optionally comprises an electric power source 132 that provides electric power to the BPU 110 (e.g., instead of the PDU 102 providing electric power to the BPU 110). In this embodiment, the PDU 102 and the cable transport unit 104 may not be part of the fracturing spread 100, and the fracturing pump trucks 108 may comprise diesel engines that provide prime mover torque to fracturing pumps. The electric power source 132 may be a connection to an electric power grid. The electric power source 132 may be one or more generators located at the wellsite that receives rotating power from an internal combustion engine such as a diesel engine or a gasoline engine or from a natural gas turbine engine. Thus, the BPU 110 provides flexibility to energy companies that do not want to rely entirely upon electric power for all fracturing equipment.

Turning now to FIG. 2, electric power distribution in the fracturing spread 100 is described. Electrical power may be provided by an electric power source 150 to the PDU 102. The electric power source 150 may be electric grid power or a generator (e.g. genset) that receives rotating power from an internal combustion engine such as a diesel engine or a gasoline engine or from a natural gas turbine engine. The PDU 102 may also receive power from the grid and gensets at the same time. In this case, the gensets are synchronized to the grid power and the PDU 102 operates in a single bus configuration. If the two power sources cannot be synchronized, the PDU 102 switchgear can be split in two. In this case, the PDU 102 operates in a split bus configuration. The PDU 102 transmits electric power via a plurality of cables 152 to the cable transport unit 104, and the cable transport unit 104 transmits electric power via a plurality of cables 154 to the manifold 106. In an embodiment, the cable transport unit 104 simply provides a vehicle for transporting the cables to the location of the fracturing spread 100 and a pass-through point for electric power distribution.

The manifold 106 provides electric power to the fracturing pump trucks 108 via a plurality of cables 156 and to the BPU 110 via one or more cables 158. In an embodiment, each fracturing pump truck 108 is provided 13,800 VAC electric power via a first cable from the manifold 106, 480 VAC electric power via a second cable from the manifold 106, and a control signal via a third cable from the manifold 106. In another embodiment, electric power may be provided to the fracturing pump trucks 108 having different voltage levels than those listed here.

In an embodiment, the BPU 110 is provided 13,800 VAC electric power by the manifold 106 via one or more cables 158. Alternatively, in an embodiment, the BPU 110 is provided 13,800 VAC electric power by the electric power source 132 via one or more cables 166. In another embodiment, electric power may be provided to the BPU 110 having a voltage level different from 13,800 VAC, and a transformer in the BPU 110 may step this received voltage up or step this received voltage down to 4,160 VAC or some other desired voltage level. In an embodiment, the transformer in the BPU 110 may step received voltage down to 3,700 VAC from 4,700 VAC.

In an embodiment, the BPU 110 is provided electric power at a voltage in the range of 11,000 VAC to 16,000 VAC by the manifold 106 via one or more cables 158. In an embodiment, the electric power source 132 may be electric grid power and may be sourced to the BPU 110 at a voltage in the range from 11,000 VAC to 16,000 VAC via one or more cables 166. In an embodiment, the electric power sourced to the BPU 110 has a frequency of between 55 Hz and 65 Hz. In an embodiment, the electric power sourced to the BPU 110 has a frequency of about 60 Hz. In an embodiment, the electric power sourced to the BPU 110 has a frequency of between 45 Hz and 55 Hz. In an embodiment, the electric power sourced to the BPU 110 has a frequency of about 50 Hz.

The BPU 110 provides electric power to the EBT 112 via one or more cables 160, to the FMT 114 via one or more cables 162, and to the CBPs 116 via one or more cables 164. The BPU 110 provides electric power at a variety of different voltage levels to different motors and loads. The BPU 110, for example, may provide 4,160 VAC to hydraulic power packs mounted on the EBT 112 and/or on the FMT 114. The BPU 110 may provide 4,160 VAC or 480 VAC to the CBPs 116. The BPU 110 may provide 480 VAC, 240 VAC, and 120 VAC to various auxiliary motors and electric loads such as cooling fan motors, battery charger motors, and other devices. It is understood that in a different embodiment, different levels of voltage than those enumerated above may be provided by the BPU 110 to the EBT 112, to the FMT 114, to the CBPs 116, and other auxiliary electrical equipment.

Figure 3A:
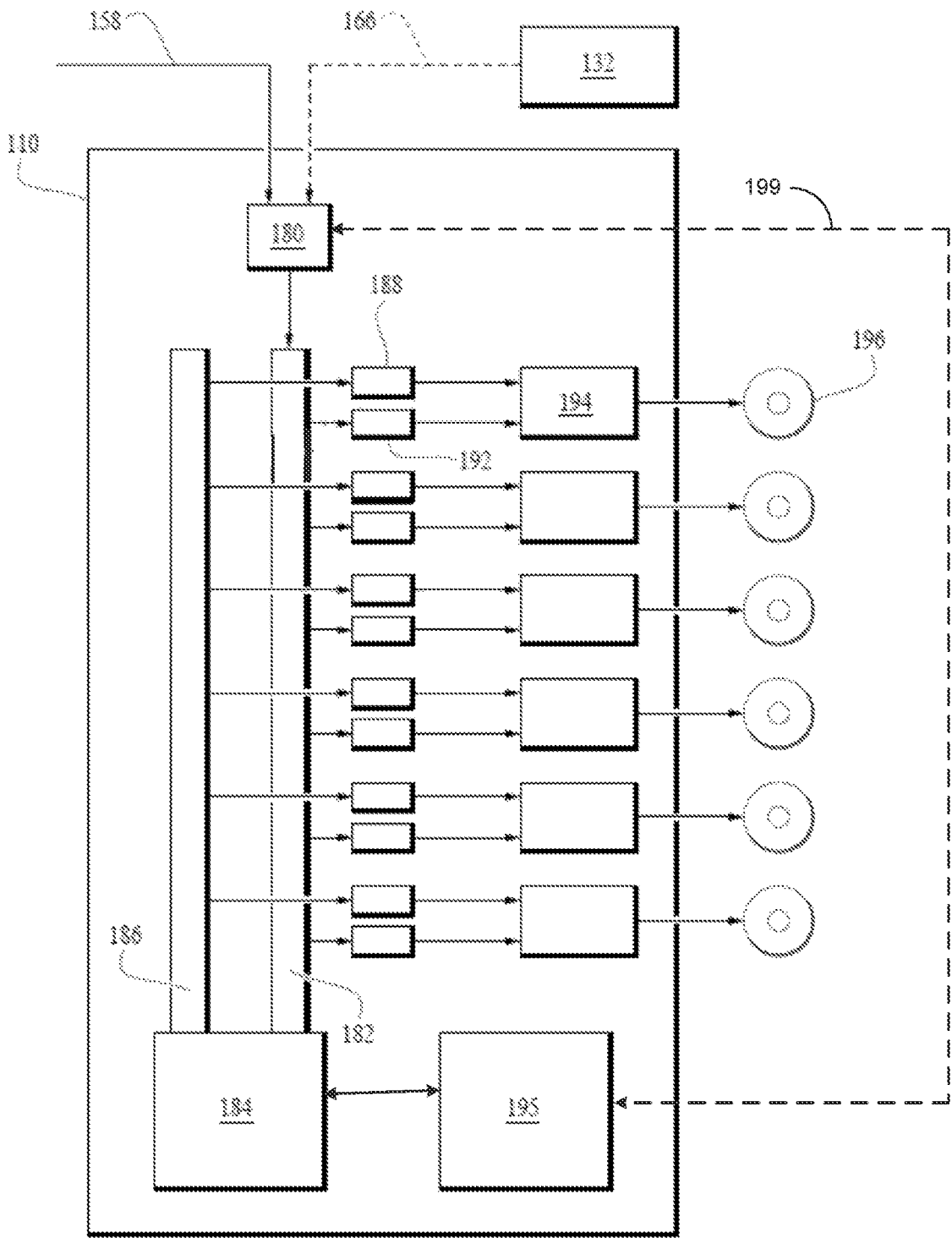
FIG. 3A is an illustration of electrical power distribution by a blender power unit (BPU) according to an embodiment of the disclosure.

Turning now to FIG. 3A, further details of the BPU 110 are described. The BPU 110 comprises one or more electric power transformers 180 to convert an input voltage level to one or more different output voltage levels. The electric power transformer 180 may be referred to as a step-down transformer in some contexts. The input voltage may be provided from the PDU 102 via cable 158 or alternatively from the electric power source 132 via cable 166. In an embodiment, the transformer 180 is configured to receive electric power via an input at a first voltage in the range 11,000 VAC to 16,000 VAC. In an embodiment, the transformer is configured to output electric power via a first output at a second voltage in the range 3,700 VAC to 4,700 VAC to a motor power bus 182. The one or more electric transformers 180 may have moveable taps which allow for changing the level of received input voltage while still delivering desired nominal output voltages such as 4,160 VAC, 480 VAC, 240 VAC, and/or 120 VAC to electrical loads.

In an embodiment, the transformer 180 is configured to output electric power via a second output at a third voltage in the range 350 VAC to 550 VAC. In an embodiment, the transformer 180 is configured to output electric power via a third output at a fourth voltage in the range 180 VAC to 280 VAC. In an embodiment, the transformer 180 is configured to output electric power via a fourth output at a fifth voltage in the range 90 VAC to 140 VAC. For example, a first tap of the transformer 180 may be adjusted to deliver the second voltage via the first output, a second tap of the transformer 180 may be adjusted to deliver the third voltage via the second output, a third tap of the transformer 180 may be adjusted to deliver the fourth voltage via the third output, and a fourth tap of the transformer 180 may be adjusted to deliver the fifth voltage via the fourth output. One side or conductor of all of the outputs may be connected to a ground tap or a reference tap of the transformer 180.

The BPU 110 comprises one or more motor power buses 182 that are configured to receive electric power from an output of the transformer 180. For example, a motor power bus 182 may receive 4,160 VAC from an output of the transformer 180. The BPU 110 comprises one or more motor soft starters 184 (or variable frequency drives) that are configured to receive electric power from the motor power bus 182. The BPU 110 comprises a motor starter bus 186 that is configured to receive electric power from the one or more soft starter 184.

A motor soft starter is a device used to gently start an AC electric motor to reduce stress when starting the motor. The use of soft starters can extend the life of electric motors as well as of electric power cables. In the absence of soft starters, inrush current to a motor may be seven to ten times higher than normal running current, and starting torque may be three times higher than running torque. Use of a soft starter can gently speed up an electric motor until it reaches nominal working speed and avoid high inrush current and extreme start-up torque. Use of a soft starter can significantly reduce electric motor heating, thereby extending the service life of the electric motor. A motor soft starter may use one or more thyristors or silicon-controlled rectifiers (SCRs) to reduce the voltage supplied to electric motors during starting. In an embodiment, the BPU 110 may employ one or more variable frequency drives (VFDs) 184 in lieu of soft starters to perform start of electric motors.

The BPU 110 may be mounted on a trailer that can be pulled behind a truck or semi-tractor to be transported to the location of the fracturing spread 100. The BPU 110 may be mounted on a moveable skid, transported to the fracturing spread 100 on a truck or trailer, and then off-loaded on location. When brought to the location of the fracturing spread 100, electric power from the PDU 102 via electric cable 158 or from electric source 132 via electric cable 166 may be connected to the BPU 110 at the transformer 180 input.

During operation, the BPU 110 may be connected via a switch gear 194 in the BPU 110 to an electric motor 196 external to the BPU 110. A plurality of switch gears 194 may be provided to connect the BPU 110 to a plurality of electric motors 196, one switch gear 194 connecting the BPU 110 to one electric motor 196. In an embodiment, one or more of the electric motors 196 may provide prime mover power to one or more electric hydraulic power packs. In an embodiment, an electric hydraulic power pack supplies rotational power to a blender that blends clean fluid with sand to form a fracturing fluid. In an embodiment, one or more of the electric motors 196 may provide torque to pumps associated with the express blending trailer (EBT) 112, the fluid management trailer (FMT) 114, one or more transport trucks 118, and/or clean boost pumps (CBPs) 116. In an embodiment, at least one of the electric motors 196 supplies torque to a centrifugal pump.

During start of the electric motor 196, a start electric power relay 188 that is connected to the motor starter bus 186 may be commanded closed, thereby providing electric power from the soft starter 184 via the start electric power relay 188 to the switch gear 194, and from the switch gear 194 to the electric motor 196 to gently bring the electric motor 196 up to nominal speed. After the electric motor 196 has reached nominal speed or nearly reached nominal speed, the start electric power relay 188 may be commanded open, removing electric power sourced by the motor starter bus 186 from the switch gear 194 and therefore removing electric power sourced by the motor starter bus 186 from the electric motor 196. After the start electric power relay 188 has been commanded open, an electric power relay 192 may be commanded closed, thereby providing electric power from the motor power bus 182 via the electric power relay 192 to the switch gear 194, and from the switch gear 194 to the electric motor 196. The electric motor 196 may continue to receive electric power via the electric power relay 192 from the motor power bus 182 until it is desired to turn off the electric motor 196, for example at the completion of a fracturing operation. In the description above of the operation of the start electric power relays 188 and the electric power relays 192 that when a relay is in an open state, it does not provide a path for electric power to pass through the relay, and when a relay is in a closed state, it does provide a path for electric power to pass through the relay.

In an embodiment, a controller 195 located in the BPU 110 may send command signals to the start electric power relays 188 and to the electric power relays 192 to start the electric motors 196 and shut-off the electric motors 196 as desired, for example in response to commands from the TCC 128 or in response to operator commands in the BPU 110, for example pushbuttons. The controller 195 may be implemented as a computer, a control system, a PLC, or another intelligent electronic device. The controller 195 may be programmed with data and/or instructions that the controller 195 interprets or executes to perform its controlling functions.

The controller 195 may manage the start electric power relays 188 such that only one of the electric motors 196 is being started at one time. Additionally, the controller 195 may manage the start electric power relays 188 and the electric power relays 192 such that the start electric power relay 188 opens before the electric power relay 192 associated with a same electric motor 196 closes. Said in other words, the controller 195 may manage start electric power relays 188 and electric power relays 192 such that the start electric power relay 188 and the electric power relay 192 for the same electric motor 196 are never closed concurrently. By providing electric starting power from the motor starter bus 186, a single or a small number of soft starters 184 may be leveraged across a plurality of electric motors 196, reducing capital costs of the BPU 110 and also conserving limited space within the physical volume of the BPU 110.

In an embodiment, the electric motors 196 powered by the BPU 110 may be about the same size and manufactured by the same manufacturer. In another embodiment, however, at least some of the electric motors 196 may be different from others of the electric motors 196 and may desirably be started using different start-up regimes. The controller 195 may store information about the different start-up regimes of different electric motors 196. During start-up of the electric motors 196, the controller 195 accordingly may configure different starting settings associated with the different start-up regimes into the soft starters 184. Prior to start-up of a first electric motor 196, the controller 195 may configure a first start-up regime into the soft starter 184 and then command the start-up of the first electric motor 196; prior to start-up of a different second electric motor 196, the controller 195 may configure a second start-up regime into the soft starter 184—where the second start-up regime is different from the first start-up regime—and then command the start-up of the second electric motor 196. In this way, the soft starters 184 can perform different start-up regimes adapted to different electric motors 196.

According to the principles of the present disclosure, the controller 195, a plurality of variable frequency drives (VFDs) 184, and relays 192 comprise a load phase back system (PBS) for controlling electrical loads in the electric fracturing spread 100. The load phase back system may further include voltage and frequency monitoring circuitry in transformer 180 that measures voltage levels and frequency levels at the inputs and/or the outputs of transformer 180. The voltage and frequency measurements are transmitted to the controller 195 as indicated by the dotted line 199.

Under the control of controller 195, the variable frequency drives (VFDs) 184 drive the electric motors 196 by varying the frequency and/or voltage of the power supply to the electric motors 196. As explained below in greater detail, if the voltage or frequency of the supplied power from the transformer 180 is out of tolerance, the controller 195 may set the operating frequency and operating voltage of each VFD 184 to control ramp-up operations and/or ramp-down operations of the electric motors 196 until the supplied power returns to within allowable limits.

Figure 3B:
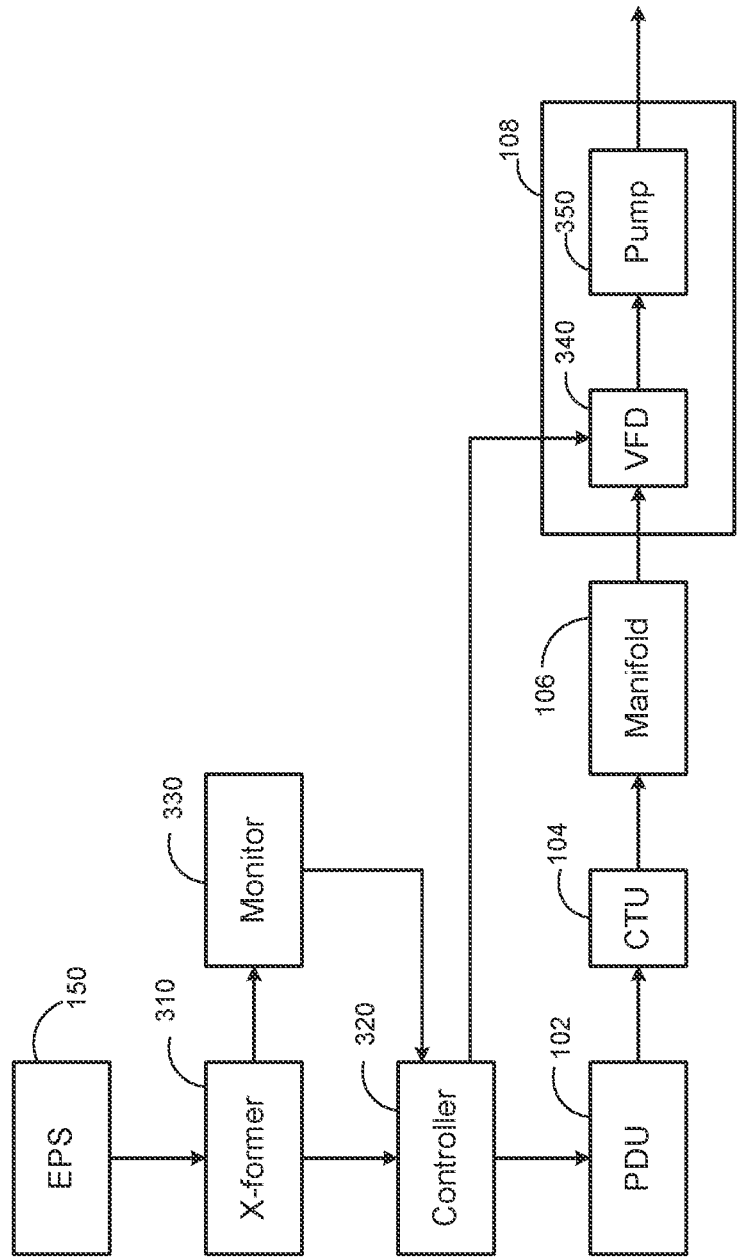
FIG. 3B is an illustration of electrical power distribution by a power distribution unit (PDU) according to an embodiment of the disclosure.

FIG. 3B is an illustration of electrical power distribution by a power distribution unit (PDU) 102 according to an embodiment of the disclosure. As noted above in FIG. 2, electrical power may be provided by an electric power source (EPS) 150 to the PDU 102. The electric power source 150 may be electric grid power or a local generator output. In an example embodiment, the output of EPS 150 may be received by a transformer 310 that is coupled to PDU 102 or is part of PDU 102. The electric power transformer 310 may convert an input voltage level to one or more different output voltage levels. The electric power transformer 310 may be a step-down transformer in some contexts. In an embodiment, the transformer 310 in the PDU 102 is configured to receive electric power via an input at a first voltage value above 16,000 VAC. The voltage value could also be above 20,780 VAC, which is the next standard medium voltage value in the US and Canada after 13,800 VAC. The PDU 102 transmits electric power to the cable transport unit (CTU) 104 and the CTU 104 transmits the electric power to the manifold 106. The manifold 106 then transmits the electrical power to a plurality of fracturing pump trucks 108. In an embodiment, each of the fracturing pump trucks 108 may include a variable frequency drive (VFD) 340 and a fracturing fluid pump 350. The fracturing fluid pump 350 represents an electrical load that is driven by the VFD 340.

In an example embodiment, the electrical power output of the transformer 310 may be transmitted to a controller 320 that is coupled to PDU 102 or is part of PDU 102. A monitor 330 measures the input voltage of transformer 310 or the output voltage of transformer 310, or both, to determine the voltage level and/or the frequency levels of the inputs and/or the outputs of transformer 310. In a first embodiment, the controller 320 may be configured to control the voltage level and/or frequency level of the output power of the transformer 310 that is input to the PDU 102. In a second embodiment, the controller 320 may be configured to control the voltage level and/or frequency level at the input of the VFD 340 and at the output of the VFD 340. In a third embodiment, the controller 320 may be configured to control the voltage level and/or frequency level of the output power of the transformer 310 that is input to the PDU 102 and may also control the voltage level and/or frequency level at the input of the VFD 340 and at the output of the VFD 340.

According to the principles of the present disclosure, the controller 320, the monitor 330, and the variable frequency drive (VFD) 340 comprise a load phase back system (PBS) for controlling electrical loads in the electric fracturing spread 100. The monitor 330 of the load phase back system measures voltage levels and frequency levels at the inputs and/or the outputs of transformer 310 and transmits the voltage and frequency measurements to the controller 320.

Figure 4A:
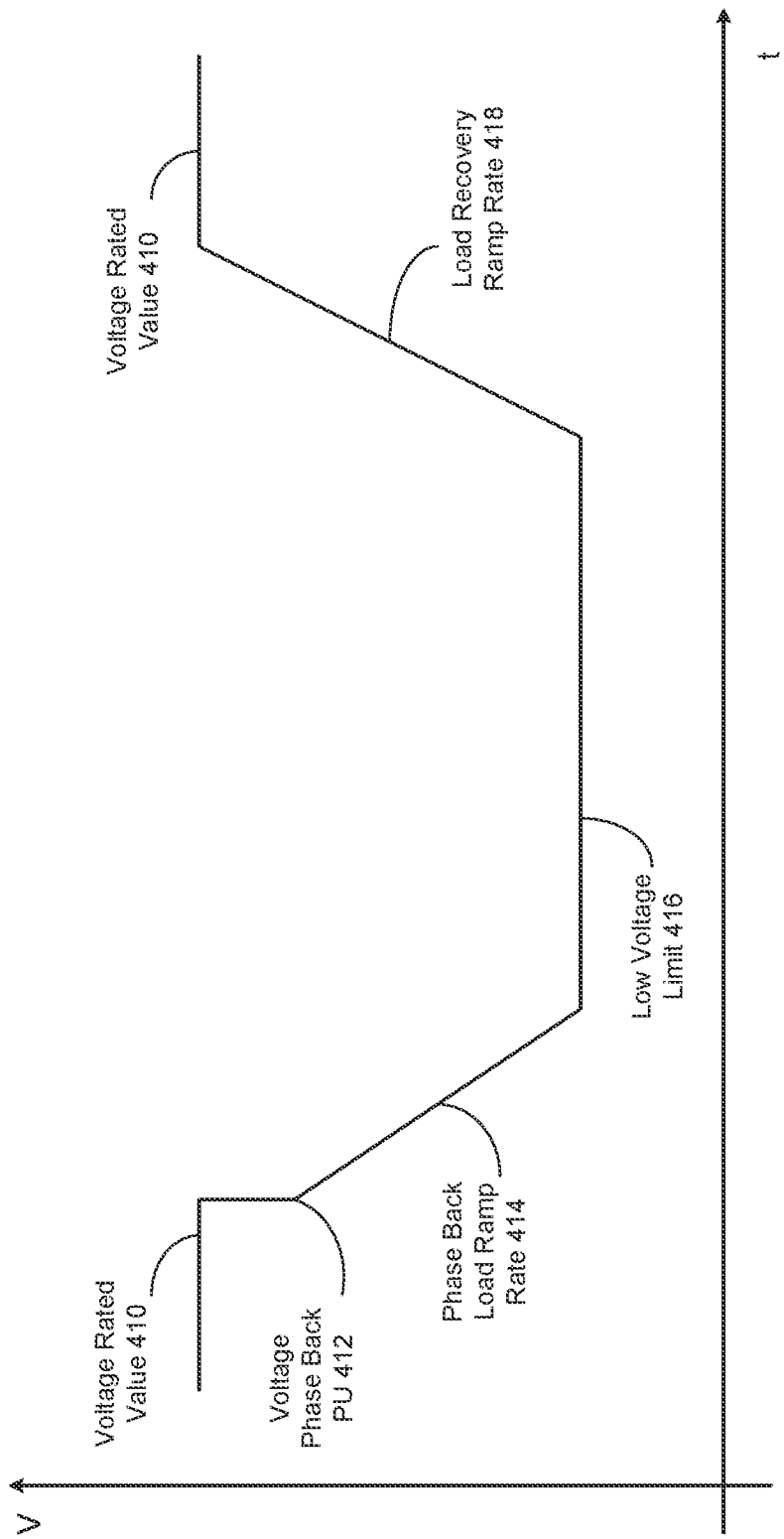
FIG. 4A is an illustration of an operation of a phase back control system according to an embodiment of the disclosure.

FIG. 4A is an illustration of an operation of a phase back control system according to an embodiment of the disclosure. In an example operation, the rated voltage for medium voltage equipment may be, for example, 13,800 V. However, the described operation may be applicable for any rated voltage value.

Under normal conditions, the system voltage operates at a voltage rated value 410. The phase back system (PBS) continuously monitors the system voltage and remains inoperative for voltage oscillations within an allowable window. The allowable window may range from a programmable voltage phase back pickup (PU) value 412 to the voltage rated value 410, for example, from 90% to 100% of nominal voltage (i.e., 13.8 kV). When the voltage drops below the voltage phase back PU value 412, the controller 195 (or 320) in the PBS may start timing and ramping down the load after a time delay has expired. The time delay can be set anywhere from 0.0 seconds to any number of seconds, for example, 120 seconds (2 minutes). The time delay can be 0.1 seconds to 10 seconds; the time delay can be 0.5 seconds to 30 seconds; the time delay can be 1.0 seconds to 60 seconds; the time delay can be 5 seconds to 2 minutes; The time delay can be 10 seconds to 2 minutes; the time delay can be 15 seconds to 2 minutes; the time delay can be 20 seconds to 2 minutes; the time delay can be 30 seconds to 2 minutes; the time delay can be 45 seconds to 2 minutes; the time delay can be 1 minute to 2 minutes.

Depending on the load conditions, the phase back load ramp rate (PBLRR) 414 may be programmed, for example, from 100 kW/second to 3000 kW/second, in 100 kW increments. The controller 195 in the PBS may continue phasing back load until a programmable low voltage limit (LVL) 416 is reached. The LVL 416 operating range may be anywhere from, for example, 63% to 86% of nominal in 1% increments. The controller 195 (or 320) in the PBS may start releasing load to the operation at a programmable load recovery ramp rate (LRRR) 418 when the voltage starts to recover. The LRRR may be programmed anywhere from 100 kW/second to 3000 kW/second in 100 kW increments. The recovery is complete when the voltage has reached the voltage rated value 410.

Figure 4B:
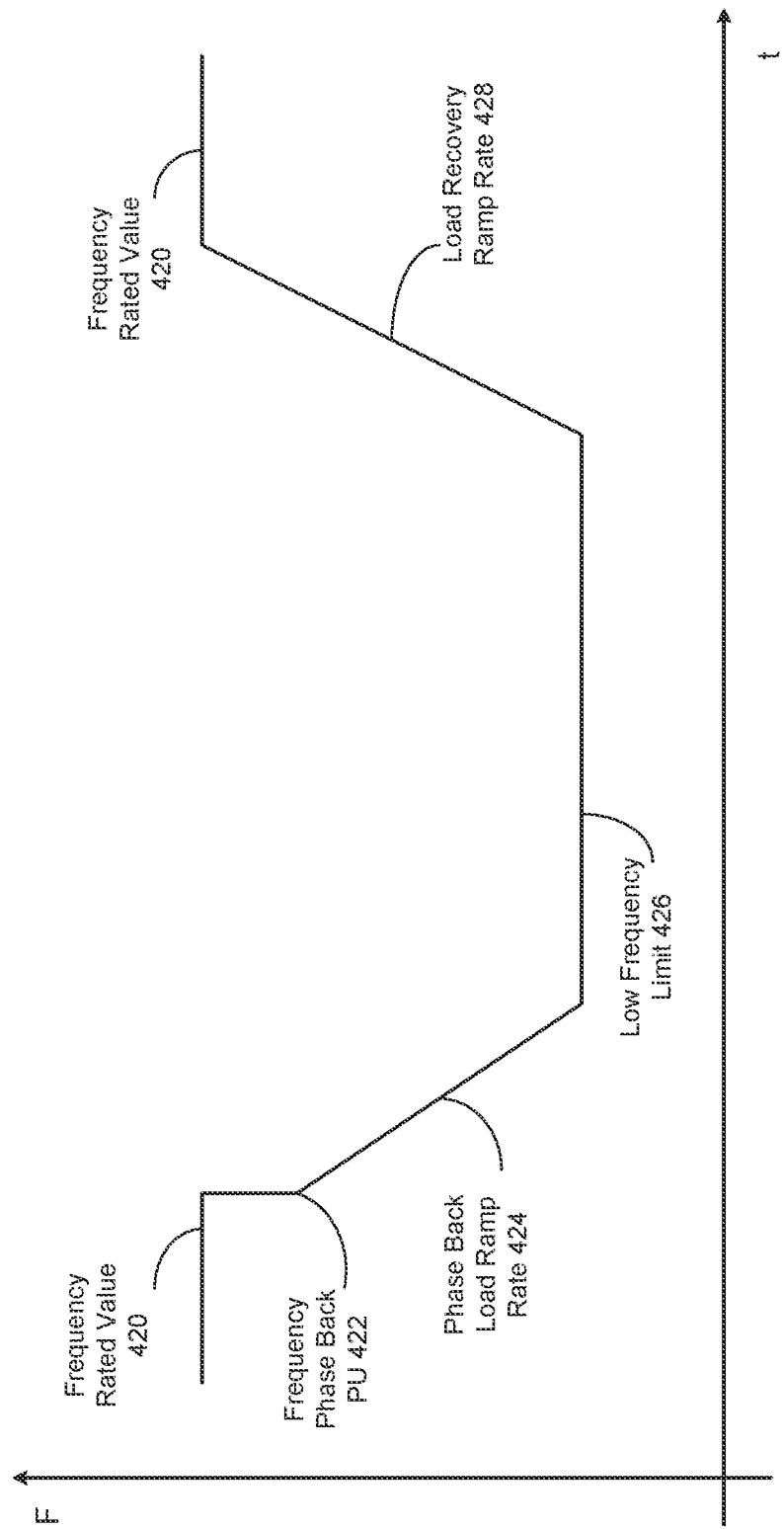
FIG. 4B is an illustration of an operation of a phase back control system according to an embodiment of the disclosure.

FIG. 4B is an illustration of an operation of a phase back control system according to an embodiment of the disclosure. In an example operation, the rated frequency for medium voltage equipment may be, for example, 60 Hz. However, the described operation may be applicable for any rated frequency value.

Under normal conditions the system frequency operates at frequency rated value 420. The phase back system (PBS) continuously monitors the system frequency and remains inoperative for frequency oscillations within an allowable window. The allowable window may range from a programmable frequency phase back pickup (PU) value 422 to the frequency rated value, for example, 90% to 100% of nominal frequency. When the frequency drops below the frequency phase back PU value 422, the controller 195 (or 320) in the PBS starts a timer. If the timer delay expires, the controller 195 (or 320) in the PBS starts to ramp down the load. The time delay may be set anywhere from 0.0 seconds to any number of seconds, for example, 100 seconds.

Depending on the load conditions, the phase back load ramp rate (PBLRR) 424 may be programmed from, for example, 100 KW per second to 3000 kW per second in 100 kW increments. The controller 195 (or 320) in the PBS may continue phasing back load until a programmable low frequency limit (LFL) 426 is reached. The LFL 426 operating range may be from, for example, 50 Hz to 57 Hz of nominal in 0.1 Hz increments. The controller 195 (or 320) in the PBS may start releasing load to the operation at a programmable load recovery ramp rate (LRRR) 428 when the frequency starts to recover. The LRRR 428 may be programmed from 100 kW/second to 3000 kW per second, in 100 KW increments. The recovery is complete when the frequency has reached the frequency rated value 420.

Figure 4C:
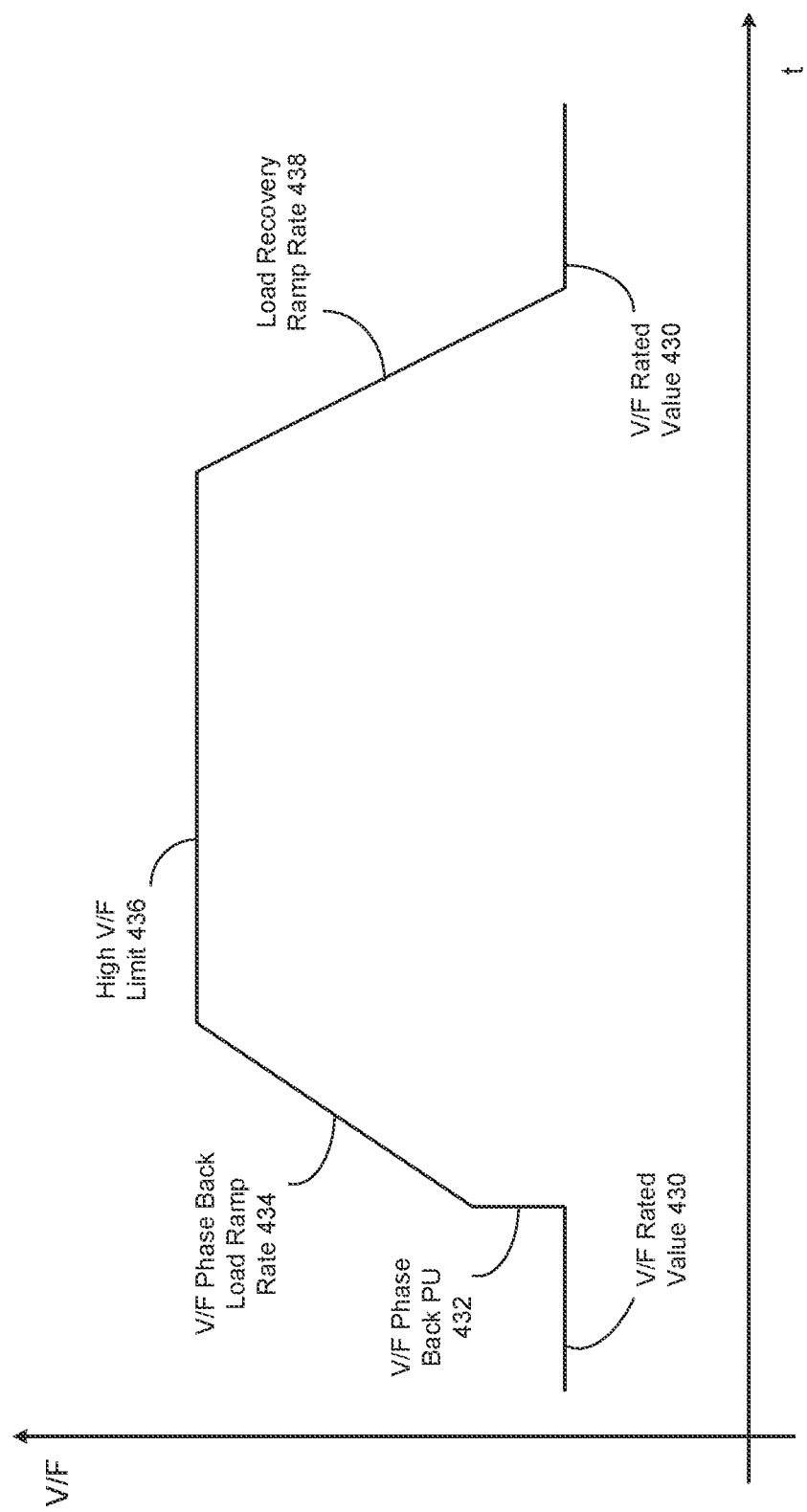
FIG. 4C is an illustration of an operation of a phase back control system according to an embodiment of the disclosure.

FIG. 4C is an illustration of an operation of a phase back control system according to an embodiment of the disclosure. In an example operation, the rated voltage and rated frequency for medium voltage equipment may be, for example, 13,800 V and 60 Hz, respectively. However, the described operation may be applicable for any rated voltage and frequency values.

Under normal conditions, the voltage/frequency (V/F) ratio operates at V/F rated value 430. The phase back system (PBS) continuously monitors the system V/F ratio and remains inoperative for V/F ratio oscillations within an allowable window. The allowable window may range from a programmable V/F ratio phase back pickup (PU) value 432 to the V/F ratio rated value, for example, 1.5 to 1.0 times the nominal V/F ratio. When the V/F ratio rises above the V/F ratio phase back PU value 432, the controller 195 (or 320) in the PBS start a timer. If the timer delay expires, the controller 195 (or 320) in the PBS starts to ramp down the load. The time delay may be set anywhere from 0.0 seconds to any number of seconds, for example, 100 seconds.

Depending on the load conditions, the V/F phase back load ramp rate (PBLRR) value 434 may be programmed from 100 kW/second to 3000 kW/second, in 100 kW increments. The controller 195 (or 320) in the PBS continues phasing back load until a programmable high V/F limit value 436 is reached. The high limit value 436 range may be, for example, from 2.0 to 4.0 times the V/F rated value, in 0.1 increments. The controller 195 (or 320) in the PBS may start releasing load to the operation at a programmable load recovery ramp rate (LRRR) value 438 when the V/F ratio starts to recover. The LRRR value 438 may be programmed, for example, from 100 kW/second to 3000 kW/second, in 100 kW increments. The recovery is complete when the V/F ratio has reached the V/F rated value 430.

Figure 5:
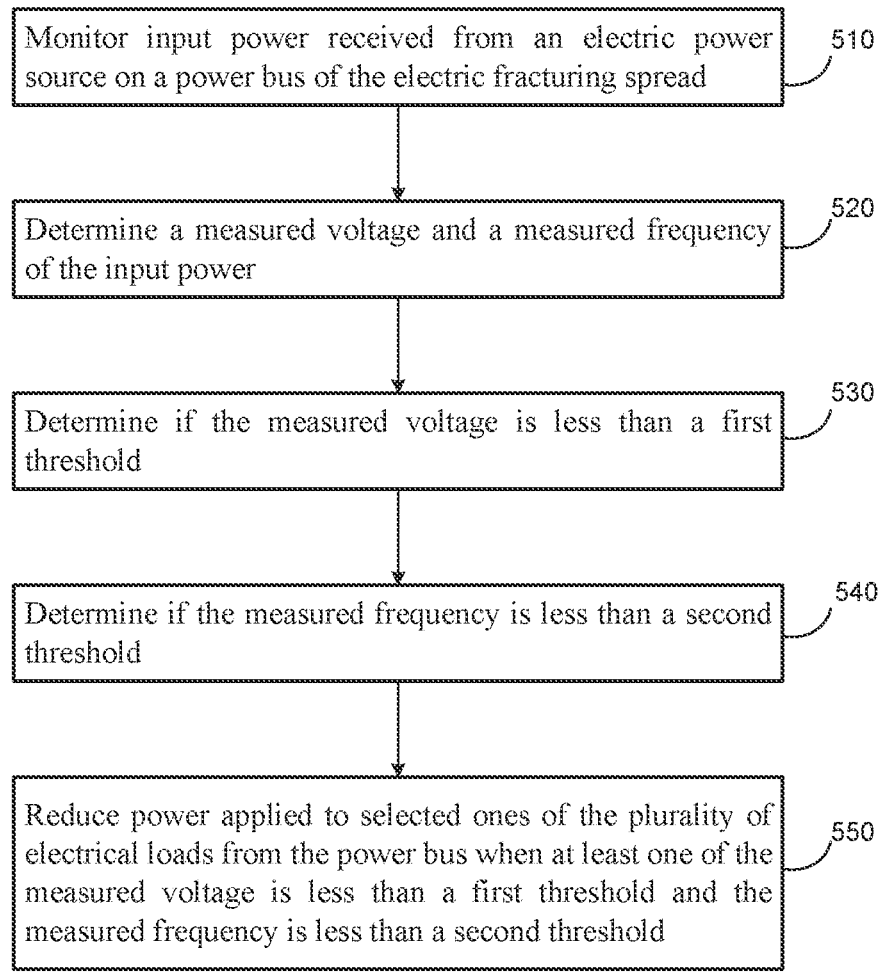
FIG. 5 is a flow diagram of a method according to an embodiment of the disclosure.

FIG. 5 is a flow diagram of a method according to an embodiment of the disclosure. In an example embodiment, the method is performed by the phase back system (PBS) and, more particularly, by the controller 195 (or 320) of the PBS. In 510, the phase back system monitors the input power received from an electric power source on a power bus of the electric fracturing spread. In 520, the phase back system determines a measured voltage and a measured frequency of the input power. In 530, the controller 195 (or 320) of the phase back system determines if the measured voltage is less than a first threshold (e.g., a voltage threshold). In 540, the controller 195 (or 320) determines if the measured frequency is less than a second threshold (e.g. a frequency threshold). In 550, the phase back system reduces the power applied to selected ones of the plurality of electrical loads from the power bus when at least one of: i) the measured voltage is less than a first threshold; and ii) the measured frequency is less than a second threshold.

In an embodiment, a method of performing a wellbore servicing operation at a wellsite is disclosed. The wellbore servicing operation may be a wellbore stimulation operation, for example a wellbore fracturing operation. The method of performing the wellbore servicing operation comprises positioning a plurality of electrically powered wellbore servicing equipment at the wellsite. The method of performing the wellbore servicing operation comprises connecting the wellbore servicing equipment to an electric power source, wherein the electric power source comprises at least one of an electric power grid and a local electric generator located proximate the electric fracturing spread. In an embodiment, the electric power grid may be provided, at least in part, by an electric service provider company (e.g., an electric power utility company). The method of performing the wellbore servicing operation comprises performing the wellbore servicing operation (e.g., performing wellbore fracturing operations such as pumping fluids and/or proppants into a wellbore under high pressure [for example, pressure in excess of 7,000 PSI and less than 200,000 PSI]). The method of performing the wellbore servicing operation comprises managing electric power during the wellbore servicing operation.

Managing electric power comprises monitoring input electric power received from the electric power source on a power bus of the wellbore servicing operation. Managing electric power comprises measuring a measured voltage and a measured frequency of the input electric power. Managing electric power comprises determining if the measured voltage is less than a first threshold. Managing electric power comprises determining if the measured frequency is less than a second threshold. Managing electric power comprises reducing electric power applied to a selected electrical load from the electric power bus when at least one of the measured voltage is less than a first threshold and the measured frequency is less than a second threshold, wherein reducing the electric power applied to the selected electrical load reduces an operating speed of a first electrical motor. In an embodiment, a variance from a threshold must continue for a predefined period of time before the electric power applied to the selected electrical load is reduced. The electric motor, for example, may be connected to a fracturing pump or to a blending pump. The management of the electric power may be performed, at least in part, by an electronic controller or a computer-based controller. The management of the electric power may be performed by the electronic controller or the computer-based controller sending different commands to a variable frequency drive (VFD) that supplies electric power to an electric motor. In an embodiment, the electrically powered equipment comprises a plurality of pumps driven by electric motors. In an embodiment, the electric power source further comprises a combustion powered engine providing electric power to a fracturing pump (e.g., to an electric motor that provides rotating mechanical power to a fracturing pump) and wherein managing electric power during the wellbore servicing operation further comprises reducing electric power applied to the fracturing pump when at least one of the measured voltage is less than a first threshold and the measured frequency is less than a second threshold. In an embodiment, a variance from a threshold must continue for a predefined period of time before electric power applied to the fracturing pump is reduced.

In an embodiment, an electric fracturing spread at a wellsite comprising a well having a wellbore penetrating a subterranean formation, the electric fracturing spread is disclosed. The electric fracturing spread comprises wellbore servicing equipment including at least one of a blending pump, a fracturing fluid pump, a clean boost pump, or a centrifugal pump; a power distribution unit configured to receive input power from a power grid and a local generator located proximate the electric fracturing spread and distribute the input power to the wellbore servicing equipment; and a load phase back system for controlling the input power distributed to the wellbore servicing equipment. The fracturing fluid pump may be configured to pump fluid (e.g., fracturing fluid and possibly proppants) into the wellbore at a pressure greater than 7,000 PSI and less than 200,000 PSI. The load phase back system comprises monitoring circuitry configured to monitor the input power received from the power grid and the local generator, the monitoring circuitry configured to determine a measured voltage and a measured frequency of the input power; and a controller configured to control the input power distributed to the wellbore servicing equipment from a power bus of the power distribution unit according to a value of the measured voltage and a value of the measured frequency of the input power, the controller configured to reduce power applied to a selected one of the wellbore servicing equipment when at least one of the measured voltage is less than a first threshold and the measured frequency is less than a second threshold. In an embodiment, the wellbore servicing equipment comprises at least one electrical motor. In an embodiment, the selected wellbore servicing equipment comprises an electrical motor configured to provide torque to at least one of the blending pump, the fracturing fluid pump, the clean boost pump, or the centrifugal pump. In an embodiment, the load phase back system further comprises at least one variable frequency drive (VFD) coupled to the electrical motor and configured to control a frequency and an amplitude of the power applied to the electrical motor.

Figure 6:
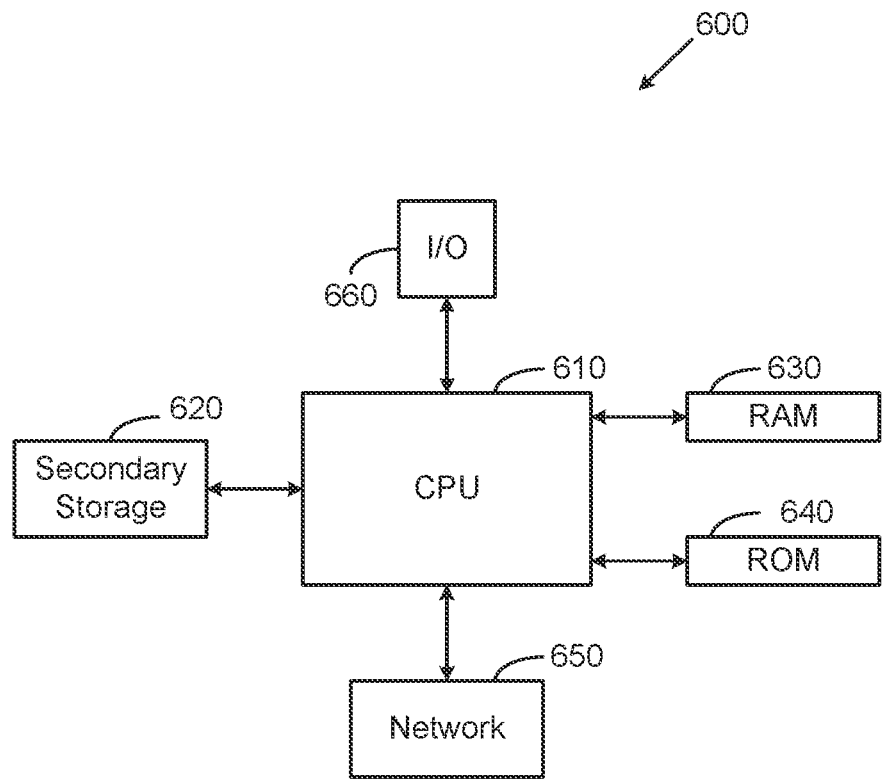
FIG. 6 illustrates a computer system 600 suitable for implementing one or more embodiments disclosed herein.

FIG. 6 illustrates a computer system 600 suitable for implementing one or more embodiments disclosed herein. The computer system 600 includes a processor 610 (which may be referred to as a central processor unit or CPU) that is in communication with memory devices including secondary storage 620, read only memory (ROM) 640, random access memory (RAM) 630, input/output (I/O) devices 660, and network connectivity devices 650. The processor 610 may be implemented as one or more CPU chips. In an example embodiment, the controller 195 in the PBS may be implemented by the computer system 600 in FIG. 6.

It is understood that by programming and/or loading executable instructions onto the computer system 600, at least one of the CPU 610, the RAM 630, and the ROM 640 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 610 may execute a computer program or application. For example, the CPU 610 may execute software or firmware stored in the ROM 640 or stored in the RAM 630. In some cases, on boot and/or when the application is initiated, the CPU 610 may copy the application or portions of the application from the secondary storage 620 to the RAM 630 or to memory space within the CPU 610 itself, and the CPU 610 may then execute instructions that the application is comprised of. In some cases, the CPU 610 may copy the application or portions of the application from memory accessed via the network connectivity devices 650 or via the I/O devices 660 to the RAM 630 or to memory space within the CPU 610, and the CPU 610 may then execute instructions that the application is comprised of.

During execution, an application may load instructions into the CPU 610, for example load some of the instructions of the application into a cache of the CPU 610. In some contexts, an application that is executed may be said to configure the CPU 610 to do something, e.g., to configure the CPU 610 to perform the function or functions promoted by the subject application. When the CPU 610 is configured in this way by the application, the CPU 610 becomes a specific purpose computer or a specific purpose machine.

The secondary storage 620 is typically comprised of one or more disk drives or tape drives and is used for non-volatile storage of data and as an over-flow data storage device if RAM 630 is not large enough to hold all working data. Secondary storage 620 may be used to store programs which are loaded into RAM 630 when such programs are selected for execution. The ROM 640 is used to store instructions and perhaps data which are read during program execution. ROM 640 is a non-volatile memory device which typically has a small memory capacity relative to the larger memory capacity of secondary storage 620. The RAM 630 is used to store volatile data and perhaps to store instructions. Access to both ROM 640 and RAM 630 is typically faster than to secondary storage 620. The secondary storage 620, the RAM 630, and/or the ROM 640 may be referred to in some contexts as computer readable storage media and/or non-transitory computer readable media.

I/O devices 660 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 650 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 650 may provide wired communication links and/or wireless communication links (e.g., a first network connectivity device 650 may provide a wired communication link and a second network connectivity device 650 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 650 may enable the processor 610 to communicate with the Internet or one or more intranets. With such a network connection, it is contemplated that the processor 610 might receive information from the network, or might output information to the network in the course of performing the above-described method steps. Such information, which is often represented as a sequence of instructions to be executed using processor 610, may be received from and outputted to the network, for example, in the form of a computer data signal embodied in a carrier wave.

Such information, which may include data or instructions to be executed using processor 610 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 610 executes instructions, codes, computer programs, scripts which it accesses from hard disk, floppy disk, optical disk (these various disk-based systems may all be considered secondary storage 620), flash drive, ROM 640, RAM 630, or the network connectivity devices 650. While only one processor 610 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 620, for example, hard drives, floppy disks, optical disks, and/or other device, the ROM 640, and/or the RAM 630 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 600, at least portions of the contents of the computer program product to the secondary storage 620, to the ROM 640, to the RAM 630, and/or to other non-volatile memory and volatile memory of the computer system 600. The processor 610 may process the executable instructions and/or data structures in part by directly accessing the computer program product, for example by reading from a CD-ROM disk inserted into a disk drive peripheral of the computer system 600. Alternatively, the processor 610 may process the executable instructions and/or data structures by remotely accessing the computer program product, for example by downloading the executable instructions and/or data structures from a remote server through the network connectivity devices 650. The computer program product may comprise instructions that promote the loading and/or copying of data, data structures, files, and/or executable instructions to the secondary storage 620, to the ROM 640, to the RAM 630, and/or to other non-volatile memory and volatile memory of the computer system 600.

In some contexts, the secondary storage 620, the ROM 640, and the RAM 630 may be referred to as a non-transitory computer readable medium or a computer readable storage media. A dynamic RAM embodiment of the RAM 630, likewise, may be referred to as a non-transitory computer readable medium in that while the dynamic RAM receives electrical power and is operated in accordance with its design, for example during a period of time during which the computer system 600 is turned on and operational, the dynamic RAM stores information that is written to it. Similarly, the processor 610 may comprise an internal RAM, an internal ROM, a cache memory, and/or other internal non-transitory storage blocks, sections, or components that may be referred to in some contexts as non-transitory computer readable media or computer readable storage media.

ADDITIONAL DISCLOSURE

The following are non-limiting, specific embodiments in accordance with the present disclosure.

A first embodiment, which is a load phase back system for controlling a plurality of electrical loads in an electric fracturing spread comprises: monitoring circuitry configured to monitor input power received from an electric power source, the monitoring circuitry configured to determine a measured voltage and a measured frequency of the input power; and a controller configured to control the power applied to the plurality of electrical loads from a power bus according to a value of the measured voltage and a value of the measured frequency of the input power, the controller configured to reduce power applied to a selected one of the plurality of electrical loads from the power bus when at least one of the measured voltage is less than a first threshold and the measured frequency is less than a second threshold.

A second embodiment, which is the load phase back system of the first embodiment, wherein the plurality of electrical loads comprises at least one electrical motor.

A third embodiment, which is the load phase back system of the first or second embodiments, wherein the selected electrical load comprises an electrical motor configured to provide torque to at least one of a blending pump, a fracturing fluid pump, an express blending trailer, a fluid management trailer, a clean boost pump, or a centrifugal pump.

A fourth embodiment, which is the load phase back system of any of the first through third embodiments, wherein the load phase back system further comprises at least one variable frequency drive coupled to the electrical motor and configured to control a frequency and an amplitude of the power applied to the electrical motor.

A fifth embodiment, which is the load phase back system of any of the first through fourth embodiments, wherein the controller controls the voltage and frequency of the at least one variable frequency drive in order to reduce the power applied to the electrical motor from the power bus when the measured voltage is less than the first threshold for a first programmable time delay, wherein reducing the power applied to the electrical motor reduces an operating speed of the at least one of the blending pump, the fracturing fluid pump, the clean boost pump, or the centrifugal pump.

A sixth embodiment, which is the load phase back system of any of the first through fifth embodiments, wherein the controller controls the voltage and frequency of the at least one variable frequency drive in order to reduce the power applied to the electrical motor from the power bus when the measured frequency is less than the second threshold for a second programmable time delay.

A seventh embodiment, which is the load phase back system of any of the first through sixth embodiments, wherein the electric power source comprises at least one of a power grid and a local generator located proximate the electric fracturing spread.

An eighth embodiment, which is the load phase back system of any of the first through seventh embodiments, wherein the power bus is connected to the electric power source by a transformer.

A ninth embodiment, which is the load phase back system of any of the first through eighth embodiments, wherein the monitoring circuitry monitors the input power received from the electric power source at the input of the transformer and at the output of the transformer.

A tenth embodiment, which is the load phase back system of any of the first through ninth embodiments, wherein the controller is further configured to increase power applied to the selected electrical loads from the power bus when the measured voltage increases above the first threshold and the measured frequency increases above the second threshold.

An eleventh embodiment, which is a method of controlling electrical loads in an electric fracturing spread comprises: monitoring input power received from an electric power source on a power bus of the electric fracturing spread; measuring a measured voltage and a measured frequency of the input power; determining if the measured voltage is less than a first threshold; determining if the measured frequency is less than a second threshold; and reducing power applied to a selected one of the plurality of electrical loads from the power bus when at least one of the measured voltage is less than a first threshold and the measured frequency is less than a second threshold, wherein reducing the power applied to the selected electrical load reduces an operating speed of an electrical motor.

A twelfth embodiment, which is the method of the eleventh embodiment, wherein the electrical motor is configured to provide torque to at least one of a blending pump, a fracturing fluid pump, an express blending trailer, a fluid management trailer, a clean boost pump, or a centrifugal pump.

A thirteenth embodiment, which is the method of the eleventh or twelfth embodiments, wherein reducing power applied to the selected electrical load comprises reducing power using a variable frequency drive.

A fourteenth embodiment, which is the method of any of the eleventh through thirteenth embodiments, wherein reducing power comprises controlling the voltage and frequency of the variable frequency drive in order to reduce the power applied to the selected electrical load from the power bus when the measured voltage is less than the first threshold for a first programmable time delay.

A fifteenth embodiment, which is the method of any of the eleventh through fourteenth embodiments, wherein reducing power comprises controlling the voltage and frequency of the variable frequency drive in order to reduce the power applied to the selected electrical load from the power bus when the measured frequency is less than the second threshold for a second programmable time delay.

A sixteenth embodiment, which is the method of any of the eleventh through fifteenth embodiments, wherein the electric power source comprises at least one of a power grid and a local generator located proximate the electric fracturing spread.

A seventeenth embodiment, which is the method of any of the eleventh through sixteenth embodiments, wherein the power bus is connected to the electric power source by a transformer.

An eighteenth embodiment, which is the method of any of the eleventh through seventeenth embodiments, wherein monitoring the input power received from an electric power source comprises monitoring the input power received from the electric power source at the input of the transformer and at the output of the transformer.

A nineteenth embodiment, which is the method of any of the eleventh through eighteenth embodiments, wherein the plurality of electrical loads comprises at least one electrical motor mounted on a fracturing truck, wherein a drive shaft of the at least one electrical motor is coupled to a fracturing pump.

A twentieth embodiment, which is a computer program product having a series of operating instructions stored on a non-transitory computer-readable medium that cause at least one processor to perform operations to controlling electrical loads in an electric fracturing spread, the operations comprising: monitoring input power received from an electric power source on a power bus of the electric fracturing spread; measuring a measured voltage and a measured frequency of the input power; determining if the measured voltage is less than a first threshold; determining if the measured frequency is less than a second threshold; reducing power applied to a selected electrical load from the power bus when at least one of the measured voltage is less than a first threshold and the measured frequency is less than a second threshold, wherein reducing the power applied to the selected electrical load reduces an operating speed of an electrical motor; and increasing power applied to the selected electrical load from the power bus when the measured voltage increases above the first threshold and the measured frequency increases above the second threshold.

A twenty-first embodiment, which is a method of performing a wellbore servicing operation at a wellsite comprising a well having a wellbore penetrating a subterranean formation comprises: positioning a plurality of electrically powered wellbore servicing equipment at the wellsite; connecting the wellbore servicing equipment to an electric power source, wherein the electric power source comprises at least one of an electric power grid and a local electric generator located proximate the electric fracturing spread; performing the wellbore servicing operation; and managing electric power during the wellbore servicing operation, wherein managing electric power comprises: monitoring input electric power received from the electric power source on a power bus of the wellbore servicing operation; measuring a measured voltage and a measured frequency of the input electric power; determining if the measured voltage is less than a first threshold; determining if the measured frequency is less than a second threshold; and reducing electric power applied to a selected electrical load from the electric power bus when at least one of the measured voltage is less than a first threshold and the measured frequency is less than a second threshold, wherein reducing the electric power applied to the selected electrical load reduces an operating speed of a first electrical motor.

A twenty-second embodiment, which is the method of the twenty-first embodiment, wherein the electrically powered equipment comprises a plurality of pumps driven by electric motors.

A twenty-third embodiment, which is the method of the twenty-first or twenty-second embodiments, wherein the electric power source further comprises a combustion powered engine providing electric power to a fracturing pump and wherein managing electric power during the wellbore servicing operation further comprises: reducing electric power applied to the fracturing pump when at least one of the measured voltage is less than a first threshold and the measured frequency is less than a second threshold.

A twenty-fourth embodiment, which is an electric fracturing spread at a wellsite comprising a well having a wellbore penetrating a subterranean formation, the electric fracturing spread comprising: wellbore servicing equipment including at least one of a blending pump, a fracturing fluid pump, a clean boost pump, or a centrifugal pump; a power distribution unit configured to receive input power from a power grid and a local generator located proximate the electric fracturing spread and distribute the input power to the wellbore servicing equipment; and a load phase back system for controlling the input power distributed to the wellbore servicing equipment, the load phase back system comprising: monitoring circuitry configured to monitor the input power received from the power grid and the local generator, the monitoring circuitry configured to determine a measured voltage and a measured frequency of the input power; and a controller configured to control the input power distributed to the wellbore servicing equipment from the power distribution unit according to a value of the measured voltage and a value of the measured frequency of the input power, the controller configured to reduce power applied to a selected one of the wellbore servicing equipment when at least one of the measured voltage is less than a first threshold and the measured frequency is less than a second threshold.

A twenty-fifth embodiment, which is the electric fracturing spread of the twenty-fourth embodiment, wherein the wellbore servicing equipment comprises at least one electrical motor.

A twenty-sixth embodiment, which is the electric fracturing spread of the twenty-fourth or twenty-fifth embodiments, wherein the selected wellbore servicing equipment comprises an electrical motor configured to provide torque to at least one of the blending pump, the fracturing fluid pump, the clean boost pump, or the centrifugal pump.

A twenty-seventh embodiment, which is the electric fracturing spread of any of the twenty-fourth through twenty-sixth embodiments, wherein the load phase back system further comprises at least one variable frequency drive coupled to the electrical motor and configured to control a frequency and an amplitude of the power applied to the electrical motor.

A twenty-eighth embodiment, which is an electric fracturing spread at a wellsite comprising a well having a wellbore penetrating a subterranean formation, the electric fracturing spread comprises: a plurality of fracturing fluid pumps; a power distribution unit configured to receive input power from a power grid and a local generator located proximate the electric fracturing spread and distribute the input power to the plurality of fracturing fluid pumps; and a load phase back system for controlling the input power distributed to the plurality of fracturing fluid pumps, the load phase back system comprising: monitoring circuitry configured to monitor the input power received from the power grid and the local generator, the monitoring circuitry configured to determine a measured voltage and a measured frequency of the input power; and a controller configured to control the input power distributed to the plurality of fracturing fluid pumps from the power distribution unit according to a value of the measured voltage and a value of the measured frequency of the input power, the controller configured to reduce power applied to a selected one of the plurality of fracturing fluid pumps when at least one of the measured voltage is less than a first threshold and the measured frequency is less than a second threshold.

A twenty-ninth embodiment, which is the electric fracturing spread of the twenty-eighth embodiment, wherein the selected fracturing fluid pump comprises an electrical motor configured to provide torque to the selected fracturing fluid pump.

A thirtieth embodiment, which is the electric fracturing spread of the twenty-eighth or twenty-ninth embodiments, wherein the load phase back system further comprises at least one variable frequency drive coupled to the electrical motor and configured to control a frequency and an amplitude of the power applied to the electrical motor.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A load phase back system for controlling a plurality of electrical loads in an electric fracturing spread comprising:
monitoring circuitry configured to monitor input power received from an electric power source, the monitoring circuitry configured to determine a measured voltage and a measured frequency of the input power; and a controller configured to control the power applied to the plurality of electrical loads from a power bus according to a value of the measured voltage and a value of the measured frequency of the input power, the controller configured to reduce power applied to a selected one of the plurality of electrical loads from the power bus when at least one of the measured voltage is less than a first threshold and the measured frequency is less than a second threshold.

2. The load phase back system of claim 1, wherein the plurality of electrical loads comprises at least one electrical motor.

3. The load phase back system of claim 1, wherein the selected electrical load comprises an electrical motor configured to provide torque to at least one of a blending pump, a fracturing fluid pump, an express blending trailer, a fluid management trailer, a clean boost pump, or a centrifugal pump.

4. The load phase back system of claim 3, wherein the load phase back system further comprises at least one variable frequency drive coupled to the electrical motor and configured to control a frequency and an amplitude of the power applied to the electrical motor.

5. The load phase back system of claim 4, wherein the controller controls the voltage and frequency of the at least one variable frequency drive in order to reduce the power applied to the electrical motor from the power bus when the measured voltage is less than the first threshold for a first programmable time delay, wherein reducing the power applied to the electrical motor reduces an operating speed of the at least one of the blending pump, the fracturing fluid pump, the clean boost pump, or the centrifugal pump.

6. The load phase back system of claim 5, wherein the controller controls the voltage and frequency of the at least one variable frequency drive in order to reduce the power applied to the electrical motor from the power bus when the measured frequency is less than the second threshold for a second programmable time delay.

7. The load phase back system of claim 1, wherein the electric power source comprises at least one of a power grid and a local generator located proximate the electric fracturing spread.

8. The load phase back system of claim 7, wherein the power bus is connected to the electric power source by a transformer.

9. The load phase back system of claim 8, wherein the monitoring circuitry monitors the input power received from the electric power source at the input of the transformer and at the output of the transformer.

10. The load phase back system of claim 8, wherein the controller is further configured to increase power applied to the selected electrical loads from the power bus when the measured voltage increases above the first threshold and the measured frequency increases above the second threshold.

11. A method of controlling electrical loads in an electric fracturing spread comprising:

monitoring input power received from an electric power source on a power bus of the electric fracturing spread;

measuring a measured voltage and a measured frequency of the input power;

determining if the measured voltage is less than a first threshold;

determining if the measured frequency is less than a second threshold; and reducing power applied to a selected one of the plurality of electrical loads from the power bus when at least one of the measured voltage is less than a first threshold and the measured frequency is less than a second threshold, wherein reducing the power applied to the selected electrical load reduces an operating speed of an electrical motor.

12. The method of claim 11, wherein the electrical motor is configured to provide torque to at least one of a blending pump, a fracturing fluid pump, an express blending trailer, a fluid management trailer, a clean boost pump, or a centrifugal pump.

13. The method of claim 12, wherein reducing power applied to the selected electrical load comprises reducing power using a variable frequency drive.

14. The method of claim 13, wherein reducing power comprises controlling the voltage and frequency of the variable frequency drive in order to reduce the power applied to the selected electrical load from the power bus when the measured voltage is less than the first threshold for a first programmable time delay.

15. The method of claim 14, wherein reducing power comprises controlling the voltage and frequency of the variable frequency drive in order to reduce the power applied to the selected electrical load from the power bus when the measured frequency is less than the second threshold for a second programmable time delay.

16. The method of claim 11, wherein the electric power source comprises at least one of a power grid and a local generator located proximate the electric fracturing spread.

17. A method of performing a wellbore servicing operation at a wellsite comprising a well having a wellbore penetrating a subterranean formation, the method comprising:

positioning a plurality of electrically powered wellbore servicing equipment at the wellsite;

connecting the wellbore servicing equipment to an electric power source, wherein the electric power source comprises at least one of an electric power grid and a local electric generator located proximate the electric fracturing spread;

performing the wellbore servicing operation; and managing electric power during the wellbore servicing operation, wherein managing electric power comprises:

monitoring input electric power received from the electric power source on a power bus of the wellbore servicing operation;

measuring a measured voltage and a measured frequency of the input electric power;

determining if the measured voltage is less than a first threshold;

determining if the measured frequency is less than a second threshold; and reducing electric power applied to a selected electrical load from the electric power bus when at least one of the measured voltage is less than a first threshold and the measured frequency is less than a second threshold, wherein reducing the electric power applied to the selected electrical load reduces an operating speed of a first electrical motor.

18. The method of claim 17, wherein the electrically powered equipment comprises a plurality of pumps driven by electric motors.

19. The method of claim 17, wherein the electric power source further comprises a combustion powered engine providing electric power to a fracturing pump and wherein managing electric power during the wellbore servicing operation further comprises:

reducing electric power applied to the fracturing pump when at least one of the measured voltage is less than a first threshold and the measured frequency is less than a second threshold.

20. An electric fracturing spread at a wellsite comprising a well having a wellbore penetrating a subterranean formation, the electric fracturing spread comprising:

a plurality of fracturing fluid pumps;

a power distribution unit configured to receive input power from a power grid and a local generator located proximate the electric fracturing spread and distribute the input power to the plurality of fracturing fluid pumps; and a load phase back system for controlling the input power distributed to the plurality of fracturing fluid pumps, the load phase back system comprising:

monitoring circuitry configured to monitor the input power received from the power grid and the local generator, the monitoring circuitry configured to determine a measured voltage and a measured frequency of the input power; and a controller configured to control the input power distributed to the plurality of fracturing fluid pumps from the power distribution unit according to a value of the measured voltage and a value of the measured frequency of the input power, the controller configured to reduce power applied to a selected one of the plurality of fracturing fluid pumps when at least one of the measured voltage is less than a first threshold and the measured frequency is less than a second threshold.

21. The electric fracturing spread of claim 20, wherein the selected fracturing fluid pump comprises an electrical motor configured to provide torque to the selected fracturing fluid pump.

22. The electrical fracturing spread of claim 21, wherein the load phase back system further comprises at least one variable frequency drive coupled to the electrical motor and configured to control a frequency and an amplitude of the power applied to the electrical motor.

* * * * *